United States Patent
Radhakrishnan

(10) Patent No.: US 11,296,980 B2
(45) Date of Patent: Apr. 5, 2022

(54) MULTICAST TRANSMISSIONS MANAGEMENT

(71) Applicant: DELL PRODUCTS L.P., Round Rock, TX (US)

(72) Inventor: Muthulakshmi Radhakrishnan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 223 days.

(21) Appl. No.: 16/556,045

(22) Filed: Aug. 29, 2019

(65) Prior Publication Data

US 2021/0067438 A1 Mar. 4, 2021

(51) Int. Cl.
| | |
|---|---|
| H04L 12/703 | (2013.01) |
| H04L 12/707 | (2013.01) |
| H04L 12/733 | (2013.01) |
| H04L 12/761 | (2013.01) |
| H04L 12/741 | (2013.01) |
| H04L 12/753 | (2013.01) |
| H04L 45/28 | (2022.01) |
| H04L 45/00 | (2022.01) |
| H04L 45/16 | (2022.01) |
| H04L 45/745 | (2022.01) |
| H04L 45/48 | (2022.01) |

(52) U.S. Cl.
CPC .............. *H04L 45/28* (2013.01); *H04L 45/16* (2013.01); *H04L 45/20* (2013.01); *H04L 45/22* (2013.01); *H04L 45/48* (2013.01); *H04L 45/745* (2013.01)

(58) Field of Classification Search
CPC ......... H04L 45/28; H04L 45/22; H04L 45/20; H04L 45/16; H04L 45/745; H04L 45/48; H04L 45/02
See application file for complete search history.

(56) References Cited

U.S. PATENT DOCUMENTS

| | | | |
|---|---|---|---|
| 8,170,040 B2 | 5/2012 | Konda | |
| 9,210,071 B2 | 12/2015 | Allan et al. | |
| 9,210,072 B2 | 12/2015 | Mahadevan et al. | |
| 9,276,877 B1 | 3/2016 | Chua et al. | |
| 9,300,483 B2 | 3/2016 | Banavalikar et al. | |
| 9,450,817 B1 | 9/2016 | Bahadur | |
| 9,843,504 B2 | 12/2017 | Han | |
| 10,833,808 B1 * | 11/2020 | Lal | ...................... H04L 12/1868 |

(Continued)

OTHER PUBLICATIONS

Cai et al., "RFC 6754—Protocol Independent Multicast Equal-Cost Multipath (ECMP) Redirect," Internet Engineering Task Force, 2012, pp. 1-12. http://www.rfc-editor.org/info/rfc6754 2012.

(Continued)

*Primary Examiner* — Habte Mered
(74) *Attorney, Agent, or Firm* — Joseph Mencher

(57) ABSTRACT

In multicast management, topology information identifying multicast distribution paths is maintained at a router serving as a root of a multicast distribution tree and/or as a first hop router. The router can detect congestion or failures based on messages from other routers. The router can request another router to change the multicast distribution paths as needed to load-balance the traffic, avoid congestion or failure, or eliminate duplicate traffic. In some embodiments, ECMP Redirect functionality is expanded to ECMP paths of arbitrary number of hops. Other features are also provided.

18 Claims, 10 Drawing Sheets

(56) References Cited

U.S. PATENT DOCUMENTS

| | | | |
|---|---|---|---|
| 2012/0120950 A1* | 5/2012 | Mentze | H04L 49/201 370/389 |
| 2012/0294166 A1* | 11/2012 | Punati | H04L 45/123 370/252 |
| 2013/0322443 A1 | 12/2013 | Dunbar | |
| 2014/0192645 A1 | 7/2014 | Zhang | |
| 2014/0226525 A1* | 8/2014 | Eastlake, III | H04L 41/12 370/254 |
| 2014/0254591 A1 | 9/2014 | Mahadevan et al. | |
| 2014/0269305 A1* | 9/2014 | Nguyen | H04L 47/00 370/235 |
| 2015/0009808 A1* | 1/2015 | Bejerano | H04L 41/0659 370/228 |
| 2015/0049631 A1 | 2/2015 | Heron | |
| 2015/0103844 A1 | 4/2015 | Zhao | |
| 2016/0142284 A1* | 5/2016 | Ma | H04L 45/28 370/225 |
| 2017/0005910 A1 | 1/2017 | Sebastian | |
| 2017/0237655 A1 | 8/2017 | Yang | |
| 2017/0353382 A1* | 12/2017 | Gupta | H04L 45/28 |
| 2018/0097645 A1 | 4/2018 | Rajagopalan et al. | |
| 2018/0375799 A1 | 12/2018 | Liu | |
| 2020/0280455 A1* | 9/2020 | Mishra | H04L 12/1863 |
| 2020/0287737 A1* | 9/2020 | Mishra | H04L 45/66 |
| 2020/0313915 A1* | 10/2020 | Seth | H04L 67/10 |
| 2020/0336429 A1* | 10/2020 | Pathikonda | H04L 47/806 |
| 2020/0389378 A1 | 12/2020 | Shahbaz | |
| 2020/0389413 A1* | 12/2020 | Lal | H04L 47/76 |

OTHER PUBLICATIONS

Cheng, "Extended Dijkstra algorithm and Moore-Bellman-Ford algorithm," 2017, pp. 1-25. arXiv:1708.04541 2017.

Fenner et al., "RFC 7761—Protocol Independent Multicast-Sparse Mode (PIM-SM) : Protocol Specification (Revised)," 2016, pp. 1-137. http://www.rfc-editor.org/info/rfc7761 2016.

Shen et al., "Discovering PIM-SM Next-Nexthop Downstream Nodes," Internet Engineering Task Force, 2004, pp. 1-8. https://tools.ietf.org/html/draft-shen-pim-nnhop-nodes-01 2004.

Moy, "RFC 2328—OSPF Version 2," The Internet Society, 1998, pp. 1-244. https://tools.ietf.org/html/rfc2328 1998.

Wei et al., "Bandwidth Aware Multicast Load Balancing," Cisco Systems, 2013, pp. 1-26. https://www.apricot.net/apricot2013/assets/apricot-2013-bandwidth-aware-multicast-load-balancing-print_1361724784.pdf 2013.

Wijnands et al., "RFC 8279—Multicast Using Bit Index Explicit Replication (BIER)," 2017, pp. 1-43. https://www.rfc-editor.org/info/rfc8279 2017.

Allan, et al., "A Framework for Computed Multicast Applied to SR-MPLS", PIM Working Group, Jun. 2018.

Eddy, "ONOS Multicast Forwarding Architecture," Jun. 2015. https://wiki.onosproject.org/display/ONOS/ONOS+Multicast+Forwarding+Architecture.

Ren, et al., "Traffic Engineering and Manageability for Multicast Traffic in Hybrid SDN", KSII Transactions on Internet and Information Systems, KSII, Jun. 2018, vol. 12(6).

RFC 2328, "OSPF Version 2", Network Working Group, Apr. 1998. https://tools.ietf.org/html/rfc2328.

RFC 3031 "Multiprotocol Label Switching Architecture", Network Working Group, Jan. 2001.

RFC 6754 "Protocol Independent Multicast Equal-Cost Multipath (ECMP) Redirect", Internet Engineering Task Force (IETF), Oct. 2012.

RFC 7761, "Protocol Independent Multicast-Sparse Mode (PIM-SM): Protocol Specification (Revised)", Internet Engineering Task Force (IETF), Mar. 2016.

RFC 8279, "Multicast Using Bit Index Explicit Replication (BIER)", Internet Engineering Task Force (IETF), Nov. 2017.

RFC 8402, "Segment Routing Architecture", Internet Engineering Task Force (IETF), Jul. 2018.

Salsano, et. al., "Hybrid IP/SDN networking: open implementation and experiment management tools", IEEE Transaction of Network and Service Management, Dec. 2015, vol. 13(1). http://dx.doi.org/10.1109/TNSM.2015.2507622.

Xylomenos, et al., "IPTV Over ICN", Proceedings of the Packet Video Workshop 2018.

Zhang, et al., "Multicast in SR Networks", PIM, Aug. 2018.

\* cited by examiner

MULTICAST TRANSMISSIONS MANAGEMENT

BACKGROUND

The present disclosure relates to computer networks, and more particularly to multicast transmissions in computer networks, including transmissions based on Sparse-Mode Protocol Independent Multicast (PIM-SM), described in RFC 7761 (Internet Engineering Task Force (IETF), March 2016), incorporated herein by reference.

FIG. 1 illustrates an IP (Internet Protocol) network domain 104 (e.g. autonomous system or other routing domain) of routers 110 (marked R0, R1, etc.) used to transfer data between other network nodes 114 (H1, H2, . . . ). Nodes 114 can be end stations, or can be routers or networks outside of domain 104. Nodes 110, 114 are interconnected by links 112. Each link 112 is a physical or virtual layer-2 network (LAN). Some or all routers 110 may be enabled to carry multicast traffic.

Network domain 104 may provide multiple paths between a given pair of nodes. For example, the following paths are provided between the nodes H2 and H3: a path through routers R6, R4, R1; a path through R6, R5, R1; and other paths. Multiple paths can be provided between PIM-SM enabled routers one of which is upstream of the other in multicast traffic flow. Multiple paths improve network reliability because if one path fails (due for example to a link failure, or a router failure, or network reconfiguration by an administrator), other paths may be available. Also, multiple paths can carry more traffic between the same pair of nodes (e.g. H2 and H3) than a single path. However, management of multiple paths takes computer resources such as bandwidth, memory space, and processor time, and increases network delays, cost, and complexity. Hence, there is a need to improve multiple path management, especially if such improvement can be realized with minimal changes to existing network technologies.

FIG. 2 illustrates an exemplary router 110 that forwards a packet 120, possibly a multicast packet, in an IP network. The router includes a data plane 110D and a control plane 110C, each of which has one or more computer processors 130 (130D or 130C respectively) executing computer instructions stored in respective memory 134 (134D or 134C). Each memory 134 also stores a respective routing table 138 (138D or 138C), which includes a Multicast Router Information Base 139 (MRIB 139D or 139C). Data plane 110D includes ports P0, P1, . . . Pn (n is a positive integer) connected to links 112. The ports are used to implement the router's interfaces.

IP packet 120 has an IP header with an IP destination address 120.DA, an IP source address 120.SA, and other fields. The packet also has a payload 120.P. When the packet arrives, its destination address 120.DA and possibly other fields are matched against the data plane's routing table 138D to obtain the outgoing interface(s) for forwarding the packet. The packet is then forwarded by the data plane on such interfaces. This packet forwarding does not involve control plane 110C, and is typically fast to maximize the router's throughput and minimize delays. To that end, the data plane typically has only minimal software programmability, and minimal flexibility in defining the data plane operation.

Control plane 110C is typically more programmable and flexible, to perform router management. Control plane 110C executes a routing protocol (OSPF for example) by communicating, through data plane 110D, with other routers 110 to obtain network topology database (DB) 140 used to build the routing table 138C. Network topology DB 140 may also include information entered by a network administrator (a human). Control plane 110C creates the data plane's routing table 138D and provides it to the data plane. (The data plane's routing table 138D may or may not be identical to table 138C, and may or may not be optimized for each port Pi (i.e. P0, . . . Pn), or for each interface, or for a group of ports or interfaces. Thus, a separate routing table 138D may be provided for each port or interface or group of ports or interfaces.)

In some multicast protocols, the routing tables 138 (and 139) store only minimal information required to forward a packet to the next hop or hops (in case of multicast). Table 1 below illustrates a multicast entry in MRIB 139 for Sparse-Mode Protocol Independent Multicast (PIM-SM), described in RFC 7761 (Internet Engineering Task Force (IETF), March 2016), incorporated herein by reference. See also U.S. Pat. No. 9,210,072 (applicant: Dell Products L.P.), issued Dec. 8, 2015, incorporated herein by reference. The MRIB entry, in the last row of Table 1, is for an (S,G) state, to forward multicast traffic from a source S to a group G of traffic receivers. For example, the source S can be H2, and the group G may consist of H3 and H4. The source S has an IP address of 171.5.6.7. The group G has a group IP address of 224.1.2.3. The entry of Table 1 can be stored on a router 110, e.g. on R4. Based on this entry, if a packet 120 has the destination address 120.DA of 224.1.2.3, and the source address 120.SA of 171.5.6.7; and the packet arrived on the router's interface P13; then the router will transmit the packet on the router's interfaces P2 and P4. (In Table 1, "iif" stands for "incoming interface", and "OIF" stands for "outgoing interface").

TABLE 1

| MRIB ENTRY | | | |
|---|---|---|---|
| Multicast DA | Source Address | iif | OIF list |
| 224.1.2.3 | 171.5.6.7 | P13 | P2, P4 |

The MRIB entry may include additional information, e.g. layer-2 encapsulation information for each outgoing interface.

The MRIB entries are created, deleted, or modified when nodes 114 join or leave multicast groups, or when changes in the network topology change require reconfiguration of the multicast distribution paths. The MRIB entries define one or more multicast distribution trees each of which defines distribution paths from a root router (e.g. R6 or R0) to the leaf routers (e.g. routers R1 and R3 for nodes H3 and H4).

If a network has multiple paths between a pair of routers, then a multicast distribution tree can be reconfigured to relieve a congested path by load-balancing the traffic over multiple paths, or to bypass a failed or congested link or router. This can be done, for example, via a protocol called ECMP Redirect in PIM-SM; see RFC 6754 (Internet Engineering Task Force (IETF), October 2012), incorporated herein by reference. See also Liming Wei, Vincent Ng (Cisco Systems), "Bandwidth Aware Multicast Load Balancing", April 2013, incorporated herein by reference. ECMP Redirect can be applied to a network portion including multiple, equal-cost links 112. FIG. 3 shows a network portion 304 with two such links, 112.1 and 112.2. Each of these links interconnects a given set of two or more routers 110. In the example of FIG. 3, there are four such routers, marked R10-R13. Routers R10 and R11 are connected, by other links 112, to sources 310, which include nodes 114 sending multicast traffic, and may include other routers 110 between the source nodes 114 and the network portion 304. Routers R12 and R13 are connected to destinations 320, which include nodes 114 receiving multicast traffic, and may include other routers 110 between the receiver nodes 114 and the network portion 304. A multicast path from a source 310 to a destination 320 may pass through any one of routers R10 and R11, any one of links 112.1 and 112.2, and any one of routers R12 and R13. These 8 available paths may be configured and reconfigured to improve load balancing or to bypass congested or failed links or routers in network portion 304. For example, different traffic flows can be directed through respective different ones of the 8 paths to load-balance the traffic. If one or more of the 8 paths fail, the other paths are available. Further, the routers R10, R11 can detect duplicate flows on different paths, and can eliminate the unnecessary flow(s).

ECMP Redirect has only local scope in the sense that it is limited to network portions of neighbor routers: R10-R13 are neighbors of each other. ECMP Redirect is not extended to larger network portions due to limitations of multicast and unicast routing protocols. Specifically, to accomplish ECMP Redirect, each of the four routers R10 through R13 uses the multicast and unicast routing protocols to obtain information on its neighbors. But the routers lack multicast-related information on other, non-neighbor routers to provide effective path management over larger network portions. A limited solution is described in Naiming Shen et al., "Discovering PIM-SM Next-Nexthop Downstream Nodes", Network Working Group, Internet Draft, July 2004. This solution allows a router to discover a downstream non-neighbor router two hops away on a multicast path. However, these techniques do not reach a router more than two hops away.

SUMMARY

This section summarizes some features of the present disclosure. Other features are defined in subsequent sections. The invention is defined by the appended claims.

Some embodiments of the present disclosure provide multicast transmission management techniques not limited to any number of hops between routers. In some embodiments, an entire multicast distribution tree is monitored at the tree's root router. The root router can request other routers to change the tree topology as needed for load-balancing, or to bypass congested or failed areas, or eliminate unnecessary traffic duplication.

In some embodiments, a path from a source of multicast traffic to the multicast receivers is monitored at the first hop router (FHR). The FHR can request other routers in the path to change the path topology as needed for load-balancing, or to bypass congested or failed areas, or eliminate unnecessary traffic duplication.

Some embodiments can be implemented with minimal changes to existing technology. For example, in some embodiments, no changes are needed to the routers' data planes 110D.

Other features are within the scope of the invention, as defined by the appended claims.

DETAILED DESCRIPTION

For purposes of this disclosure, a router or other network node may include any computer system, including for example a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. A network node may include random access memory (RAM), one or more processing resources such as a central processing unit (CPU) or hardware or software control logic, ROM, and/or other types of nonvolatile memory. Additional components may include one or more disk drives, one or more ports for communicating with external devices as well as various input and output (I/O) devices, such as a keyboard, a mouse, touchscreen and/or a video display. The network node may also include one or more buses operable to transmit communications between the various hardware components.

As used herein, the term "memory" can denote any type of computer storage, including semiconductor, magnetic, or optical types.

Figure 1:
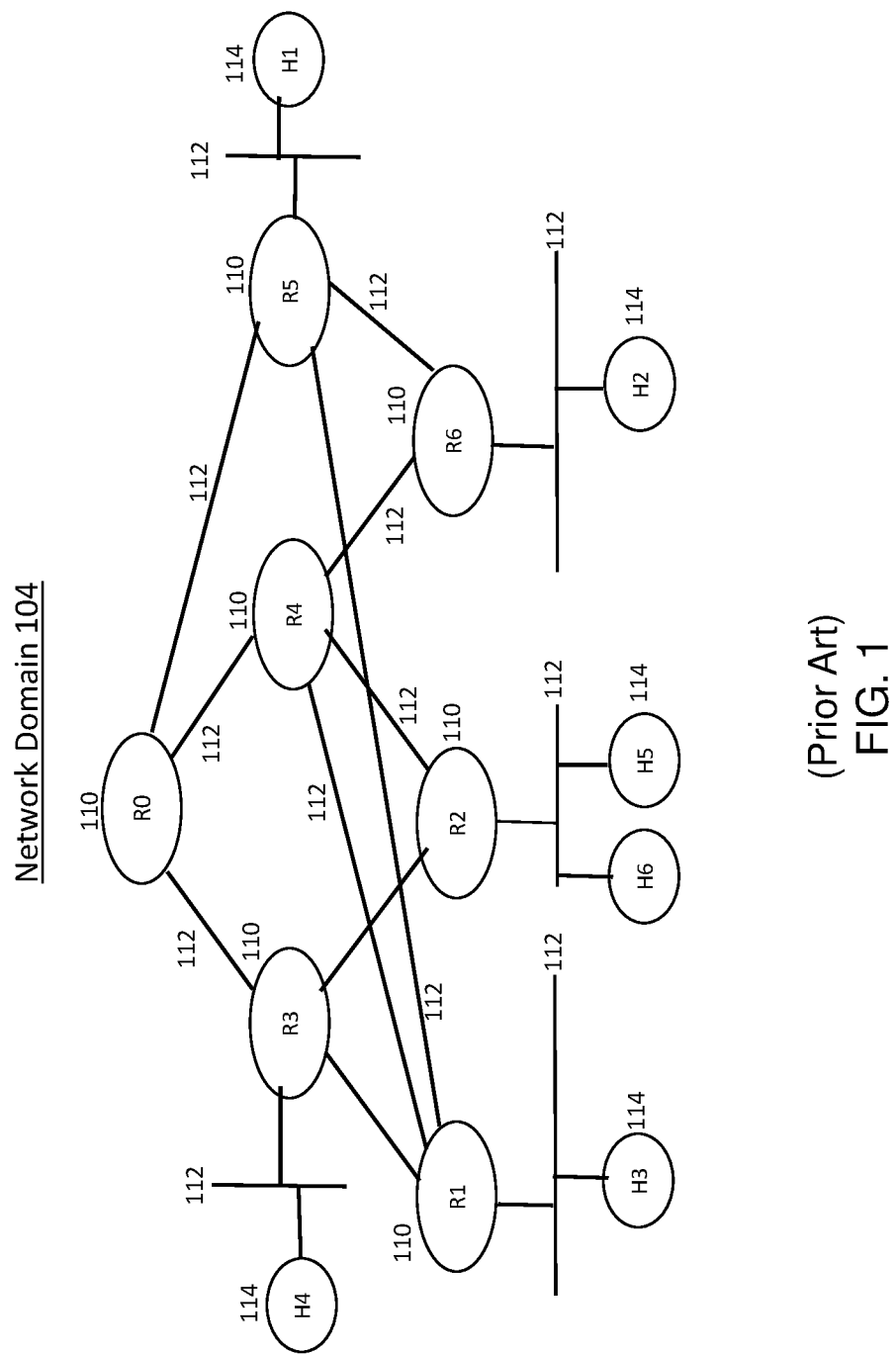
FIG. 1 is a schematic view illustrating a network embodiment.
Figure 4:
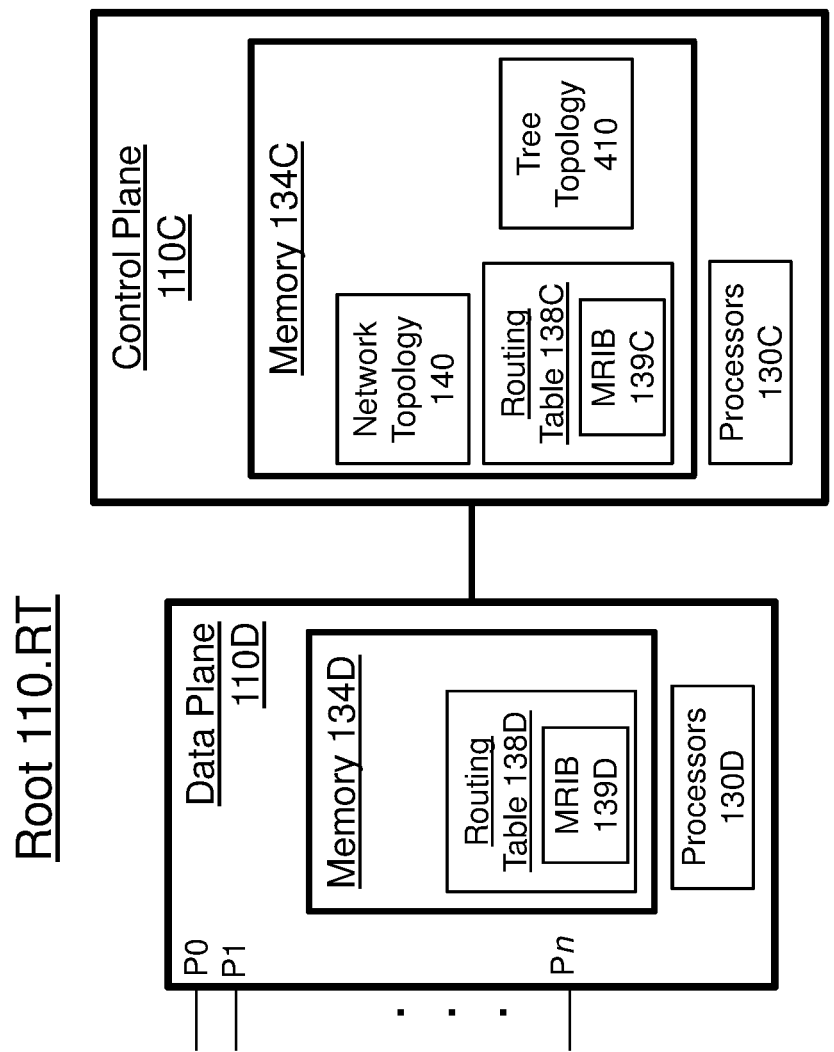
FIG. 4 is a schematic view illustrating a router embodiment.

FIG. 4 is a block diagram of an exemplary router 110.RT configured as a root of a multicast distribution tree, e.g. a shared tree (Rendezvous Point (RP) tree, i.e. RPT) or a shortest-path tree (SPT). For example, in the network domain of FIG. 1, if a group G includes nodes H2 and H3 receiving traffic from H4 on the RPT rooted at R0, then R0 can be configured as in FIG. 4. If H2 and/or H3 receive traffic from H4 on the SPT, then router R3 can be configured as in FIG. 4 if R3 is H4's First Hop Router (FHR) and hence is the SPT root. A network domain may include many trees and hence many root routers 110.RT. All or some of the root routers may be configured as in FIG. 4. Other root or non-root routers may be as in FIG. 2 or of some other type.

In some embodiments, root and non-root routers 110 have the same hardware, and the root configuration is defined by software (not shown) stored in memory 134C. These details are exemplary and not limiting.

Figure 2:
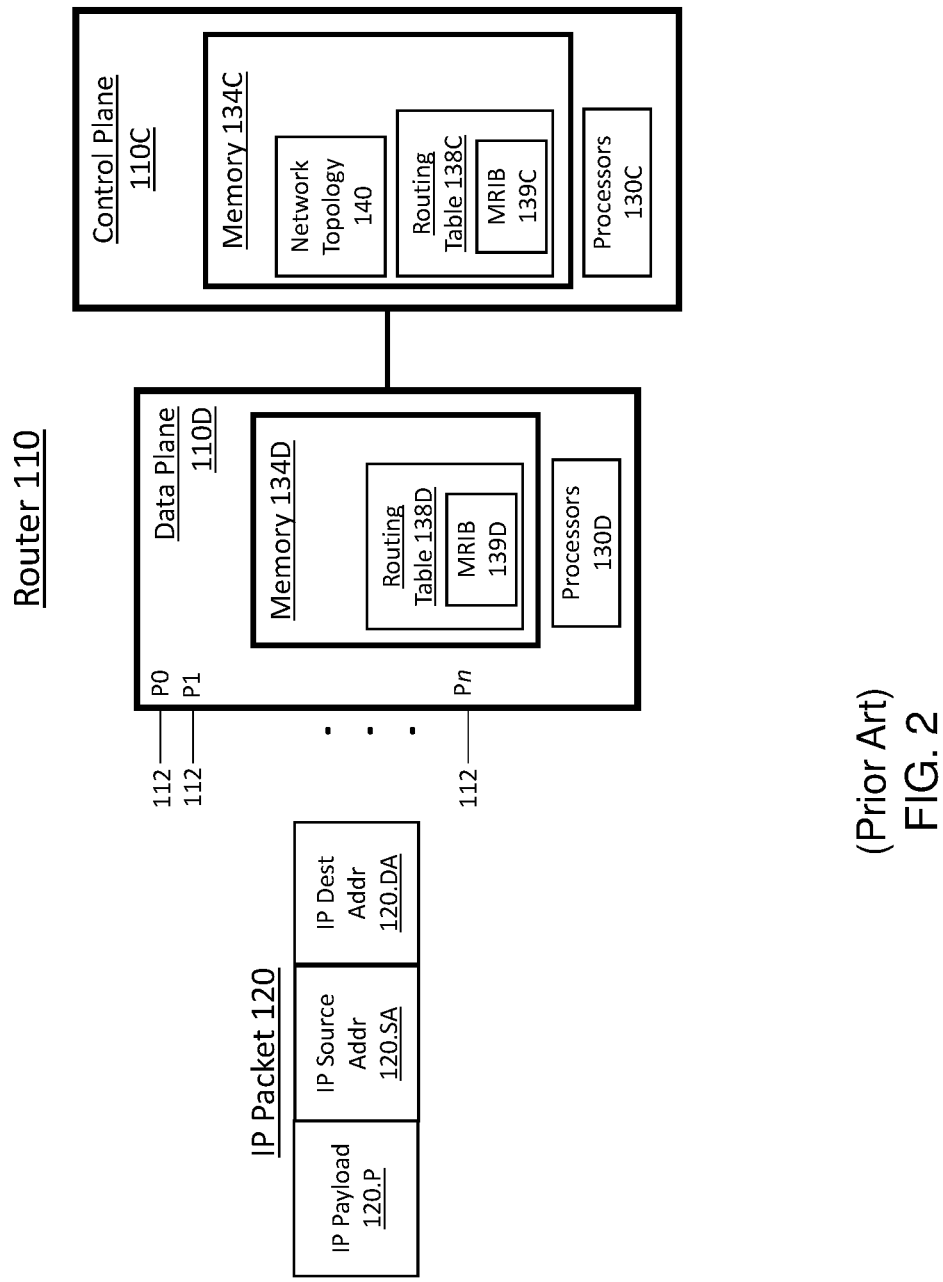
FIG. 2 is a schematic view illustrating a router embodiment.

Data plane 110D of router 110.RT may or may not be as in FIG. 2.

Control plane 110C of router 110.RT includes, in addition to the items shown in FIG. 2, a database 410 describing the topology of the corresponding tree. In particular, DB 410 identifies all the routers in the tree and describes which of the routers are directly interconnected. In some embodiments, a group of routers can be interconnected by multiple links (as in FIG. 3 for example), and DB 410 may identify each link and, for each link, the routers and/or router interfaces connected to the link.

Figure 5:
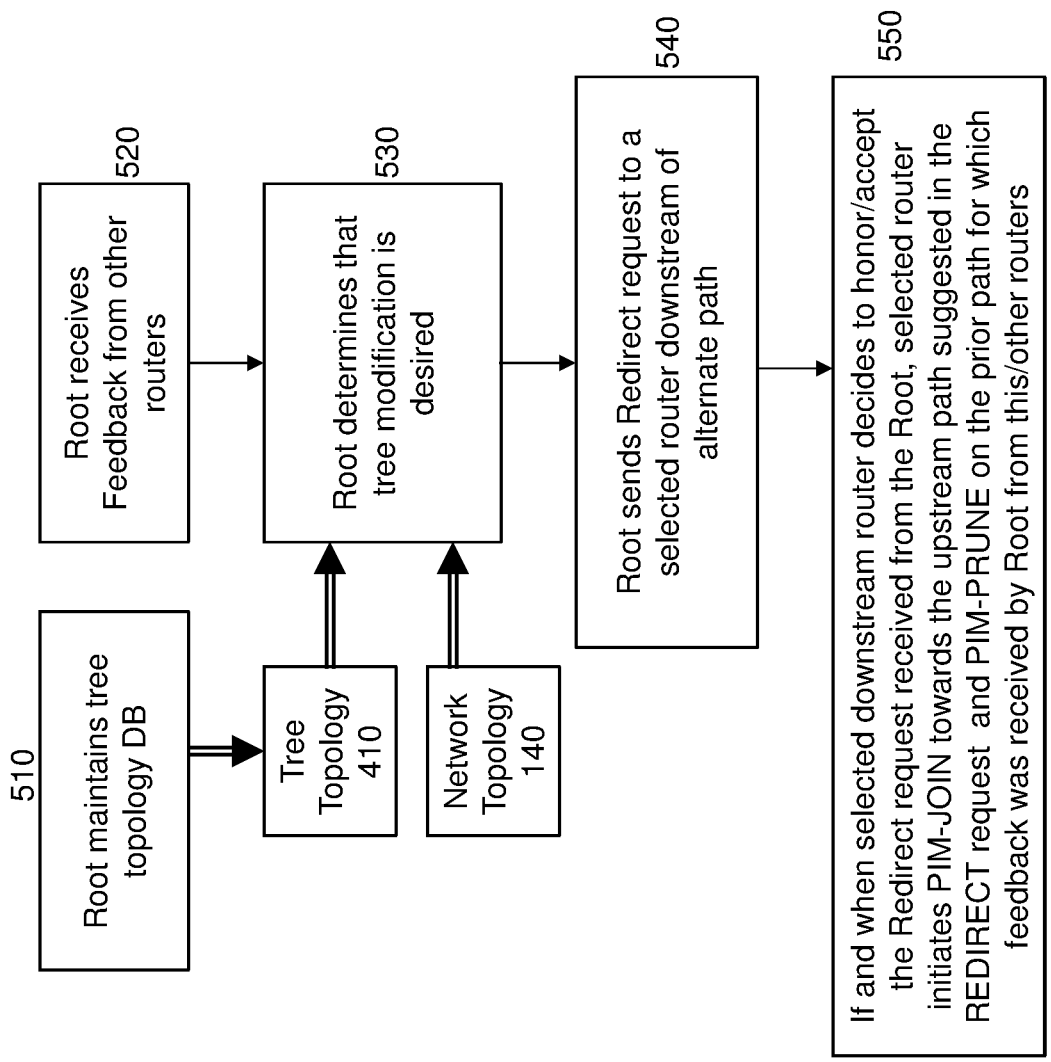
FIG. 5 is a flow chart illustrating an embodiment of a network management method.

Root router 110.RT can participate in network management as shown in FIG. 5. In block 510, root 110.RT builds and maintains tree topology DB 410. The root also maintains network topology DB 140 based on the IGP (Interior Gateway Protocol, e.g. OSPF), possibly using known techniques.

The root receives, in block 520, feedback messages from other routers 110 regarding possible congestion or failures.

Based on this feedback (block 530) and/or on the root's own measurements on the links directly connected to the root, and based on tree topology DB 410 and network topology DB 140, the root 110.RT may determine that a tree portion is congested or has failed, and the tree should be modified. This determination can be made using the same criteria as in ECMP Redirect, or in some other way. For example, in FIG. 6, root 110.RT is R0, which may be the RP for a group G of nodes H2 and H5. The RPT includes the following (*,G) paths: R0-R4-R6 to H2, and R0-R4-R2 to H5. Router R4 or R6 has detected congestion or failure on the link R4-R6, and sent a suitable feedback message to root R0 (block 520). Based this feedback, and possibly feedback from other routers, the root R0 determines, in block 530, that the traffic should be re-directed to an alternate path R0-R5-R6. For example, the root R0 can determine the alternate path R0-R5-R6 as the shortest (i.e. lowest cost) alternate path, by invoking an IGP process to examine the unicast routing table or other IGP data. In some embodiments, the shortest path is determined by executing the extended Dijkstra algorithm described in Cong-Dian Cheng, "Extended Dijkstra algorithm and Moore-Bellman-Ford algorithm", arXiv:1708.04541v1 [math. OC], 2017, available at https://arxiv.org/abs/1708.04541, incorporated herein by reference. For example, in some embodiments using OSPF, the root R0 stores, in its network topology DB 140, the OSPF link state advertisements (LSAs); see RFC 2328, "OSPF Version 2", Network Working Group, April 1998, available at https://tools.ietf.org/html/rfc2328, incorporated herein by reference. Root R0 runs the extended Dijkstra algorithm on a network topology obtained from DB 140 by removing the LSAs on link R4-R6. Before running the algorithm, root R0 may also remove, from DB 140, other LSAs known to the root as corresponding to congested or failed links or routers as indicated by feedback received in block 520 and/or by R0's own measurements on the links R0-R4, R0-R3, R0-R5.

The root 110.RT may determine the alternate path based on other factors in addition to, or instead of, the cost. For example, available alternate paths may be limited to a selected set of paths or links or routers. Such limitations may be implemented by an administrator or automatically, and may be necessitated by a service level agreement (SLA), and/or a desired Quality of Service (QoS), and/or security considerations (e.g. a need to set aside network resources for security-related traffic, or not to allow some traffic at security-sensitive links or routers), or by other means.

If the root decides, in block 530, that the tree should be modified to shift at least some of the traffic to an alternate path (e.g. R0-R5-R6), the root proceeds to form the alternate path; see block 540. For example, in some multicast protocols including PIM-SM, multicast paths are formed by Join messages sent by downstream routers (e.g. R6) toward the root (e.g. R0). In such embodiments, in block 540, root 110.RT sends a Redirect request (which is possibly a unicast message) to a router (e.g. R6) downstream of the failed or congested link or router (downstream of the link R4-R6 in FIG. 6). If multiple routers report congestion or failure in the same path, then the Redirect request may be sent to a router downstream of all the congested or failed links or routers.

In some embodiments, the Redirect request completely or partially specifies the alternate path (e.g. the path R0-R5-R6). Examples of Redirect requests are provided below.

In block 550, a downstream router (e.g. R6) receives the Redirect request, and determines whether to arrange for the alternate path. In some embodiments, the Redirect request may or may not be ignored by the downstream router based, for example, on the factors described above in connection with block 530 and other factors (SLA, QoS, security, static configuration by administrator, etc.). In other embodiments, the downstream router is configured to always automatically perform the Redirect request.

Figure 6:
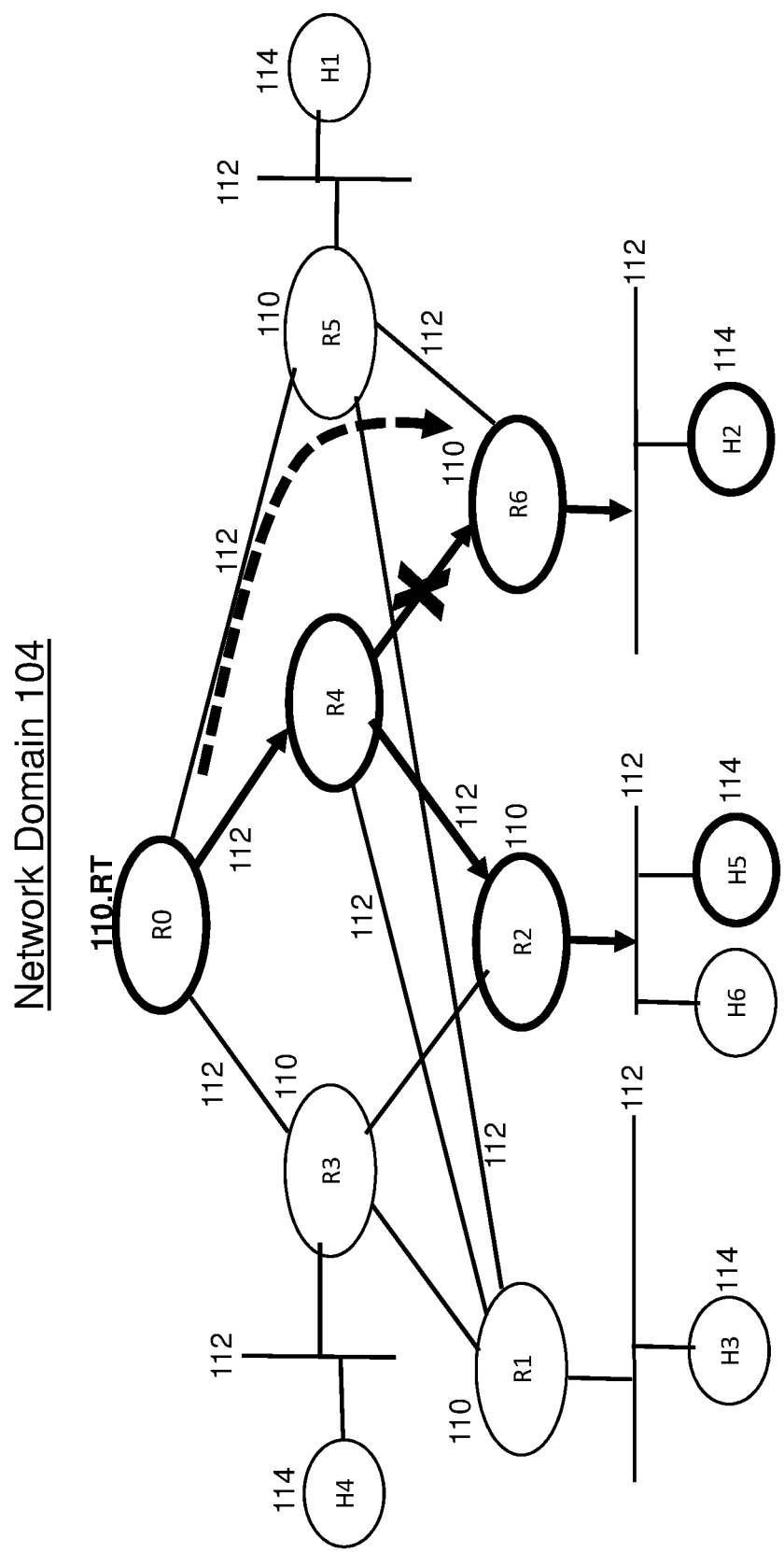
FIG. 6 is a schematic view illustrating an embodiment of a network management method.

To perform the Redirect request, the downstream router sends suitable Join/Prune messages. In the example of FIG. 6, a (*,G) Join is sent to R5. The Join includes an identification of the alternate path R0-R5-R6. The Join is propagated by R5 on the alternate path. The propagated Joins identify the entire alternate path R0-R5-R6, or at least an upstream path portion on which they will need to be propagated.

R6 also sends a (*,G) Prune to R4. If the Prune cannot be sent to R4 on the R4-R6 link due to this link failure, the router R6 may sent a unicast message to R4, over whatever path is available at the time, to request R4 to execute a Prune as if the Prune were sent on R4-R6.

The same process is followed for a SPT, i.e. if the root is a FHR.

In some embodiments, the root is the RP, and the Redirect request (block 540) may request the Last Hop Router (LHR), such as R6, to switch from the RPT to the SPT for one or more of sources S specified in the Redirect request. In some embodiments, the root is the FHR, and the Redirect request may be sent by the FHR, and may request the LHR to switch from the SPT to the RPT for one or more specified sources or for all the sources.

Now some embodiments of the scheme of FIG. 5 will be described in more detail.

Block 510: Tree Topology DB

Block 510 can be implemented using any of the methods described below, or a combination of such methods.

In one method, each time any router 110 creates, deletes, or modifies its MRIB 139C with respect to any tree, the router informs the tree's root 110.RT about the MRIB modification, possibly by a unicast message, so the root 110.RT may update its tree topology DB 410.

In another method, the root 110.RT learns the tree topology from modified Join/Prune messages. Table 2 below shows an exemplary modified Join/Prune message. Table 2 shows only the payload 110.P (FIG. 2). The IP header of the message can be as specified in PIM-SM, i.e. the IP destination address 110.DA can be "ALL-PIM-ROUTERS", and the IP source address 110.SA can be a domain-wide reachable address of the router sending the Join/Prune message. The domain-wide reachable address can be defined by the IGP (Interior Gateway Protocol), e.g. as a router ID in OSPF (same as router IP address). The TTL field is "1".

All the fields in Table 2 are as in the aforementioned RFC 7761, except for the additional entries "J/P Path" inserted after corresponding entries "Encoded Joined Source Address" and "Encoded Pruned Source Address". As defined in RFC 7761 and illustrated in Table 2, a Join/Prune message may combine multiple Join and Prune messages for individual Join and Prune operations for the same or different groups G. The combined message of Table 2 combines two Joins and two Prunes, for the same group G (defined by "Encoded Multicast Group Address 1"). For each Join or Prune, the source can be S or star (*), as specified by the corresponding "Encoded Joined Source Address" or "Encoded Pruned Source Address". If the source is the star, then the corresponding "Encoded Joined Source Address" or "Encoded Pruned Source Address" includes the corresponding RP address. All the router addresses are domain-wide reachable. For example, in OSPF, each router address is the router ID, defined as the router's highest loopback address or, if the router has no loopback address, the router's highest IP interface address.

Each Join or Prune operation in the combined message is performed separately by the router 110 receiving the message. This receiving router is specified by the "Encoded Unicast Upstream Neighbor Address" in the combined message.

TABLE 2

MODIFIED JOIN/PRUNE COMBINED MESSAGE FORMAT

| PIM Ver | Type = 3 | Reserved | Checksum |
|---|---|---|---|
| Encoded Unicast Upstream Neighbor Address (e.g. R4 or R5) | | | |
| Reserved | Num groups | | Holdtime |
| Encoded Multicast Group Address 1 | | | |
| Number of Joined Sources | | Number of Pruned Sources | |
| Encoded Joined Source Address 1 | | | |
| J/P Path | | | |
| Encoded Joined Source Address 2 | | | |
| J/P Path | | | |
| Encoded Pruned Source Address 1 | | | |
| J/P Path | | | |
| Encoded Pruned Source Address 2 | | | |
| J/P Path | | | |

The Join/Prune combined message may include, for one or more of the constituent Join or Prune messages, a field "J/P Path" that specifies the path on which the individual Join or Prune is being propagated. In particular, J/P Path specifies the sequence of routers originating or propagating the Join or Prune. In addition, J/P Path may identify the links 112 and/or router interfaces in the path. For example, if a Join was initiated by a node 114 joining a group, the corresponding "J/P Path" starts with the node's designated router (DR), i.e. the LHR. Each router 110 propagating the Join augments J/P Path with the router's ID, and possibly the ID of the link (and/or the router's interface address) on which the Join is being received or propagated. For example, in FIG. 6, when R6 sends a Join to R5, the corresponding "J/P Path" includes only the router R6. When R5 propagates this Join to R0, the corresponding "J/P Path" includes the sequence <R6, R5>. Alternatively, when R6 sends a Join to R5, the corresponding "J/P Path" includes the routers R6 and R5. When R5 propagates this Join to R0, the corresponding "J/P Path" includes the sequence <R6, R5, R0>.

The Prunes' J/P Paths are constructed in the same way.

When a router 110 receives the combined Join/Prune message as in Table 2, the router may extract and separate the individual constituent Joins and Prunes because the individual Joins or Prunes may be associated with different root routers. Each J/P path will follow the corresponding individual Join or Prune.

When the individual Join or Prune reaches the corresponding root 110.RT, the root updates its DB 410 based on the corresponding "J/P Path". The root also updates its MRIB 139 as in conventional PIM. For example, when the root R0 receives the individual Join propagated by R5, the root R0 determines from the corresponding "J/P Path" that the Join came on the path R6-R5-R0, and R0 modifies the tree topology DB 410 to record the tree branch R6-R5-R0 (also denoted as R0-R5-R6 herein) for the corresponding (*,G) state. When R0 receives the Prune from R4, R0 deletes the R0-R4-R6 branch in DB 410. In some embodiments, R0 deletes R0-R4-R6 after receiving the Join without waiting for the Prune.

Sometimes, a Join or Prune does not reach the root. Consider the following example based on the network topology of FIG. 1, assuming that R0 is the RP for some group G, and assuming use of J/P Paths. At first, the group G was empty, and the RPT had only the root R0. Then H2 joins the group, and R6 sends a Join to R4 with the corresponding J/P Path. R4 propagates the Join to R0. R0 updates the tree topology DB 410 with the path R0-R4-R6. Both R0 and R4 create, in their MRIBs 139, a (*,G) state corresponding to this path (see Table 1). The OIF list in R4 specifies the R4-R6 interface for reaching R6.

Then H5 joins the group. R2 sends a Join to R4. R4 already has a (*,G) state for reaching R6. Therefore, R4 does not propagate the Join to R0, but simply adds the R4-R2 interface to the OIF list (Table 1).

In some embodiments, R4 also informs R0 of this Join by encapsulating this Join in a unicast message with the "J/P Path" of R2-R4, and R0 updates its tree topology DB 410 accordingly.

In other embodiments, R4 propagates the Join to R0 with "J/P Path" of R2-R4. If there are intermediate routers between R4 and R0, each intermediate router propagates this Join upstream, updating the J/P Path accordingly, but without changing the router's MRIB. R0 updates its tree topology 410 upon receiving the Join, but does not change its MRIB.

In still other embodiments, R4 does not propagate the Join to R0 and does not inform R0 of the new branch R2-R4. The tree topology DB 410 is incomplete, which may diminish the network's ability to respond to congestion or failures.

In some embodiments, the Prune messages are handled using any of the options described above for the Joins, possibly in the same way as the Joins, or in some other way. For example, in some embodiments, the Join messages include J/P Paths, but the Prune messages do not; rather, when a Prune leads a router 110 to modify its MRIB, the router 110 informs the root R0, possibly via a unicast message, specifying the MRIB modification.

In another exemplary embodiment, different trees are handled differently. For example, J/P Paths may be used for some trees, but for other trees the topology changes may be conveyed to the roots by unicast messages specifying the MRIB changes in the trees.

In PIM-SM, each router 110 periodically re-sends Joins to confirm that the router still wishes to receive the traffic for the corresponding groups and sources. Depending on the embodiment, the routers may or may not inform the root of the periodic Joins if the Joins do not change the routers' MRIBs, and the periodic Joins may or may not have J/P Paths.

Router Identification

In some embodiments, routers 110 are identified by Node IDs in J/P Paths and possibly in DB 410 and/or 140. Use of Node IDs instead of router IDs improves security. Also, the Node IDs can be shorter than the router IDs, to reduce the size of the J/P Paths and possibly of DB 410 and/or 140. The Node IDs can be assigned by the administrator or in some other way.

Figure 7:
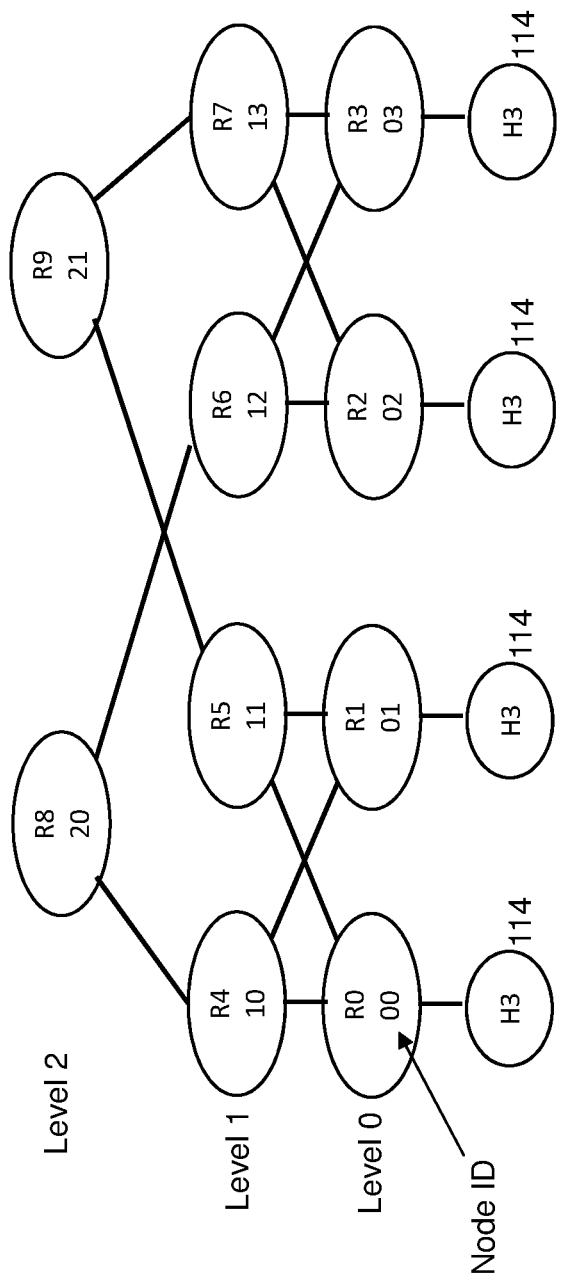
FIG. 7 is a schematic view illustrating a network embodiment.

Another possible Node ID assignment scheme is suitable for multi-level networks such as shown in FIG. 7. Examples of multi-level networks, such as Clos networks and fat-tree networks, are described in U.S. Pat. No. 9,210,071, issued Dec. 8, 2015 (inventors: Allan et al.); and U.S. Pat. No. 8,170,040, issued May 1, 2012 (inventor: Konda); both incorporated herein by reference. A multi-level network includes multiple levels of routers 110 (levels 0, 1, 2 in FIG. 7). Each router is directly connected only to routers of adjacent levels. A router's Node ID may consist of: the level number, and the router number at that level. For example, in one scheme, for routers R0 through R3, the level number can be defined as 0, and the Node IDs can be from 00 (for router R0) through 03 (for R3). For routers R4 through R7, the level number can be 1, and the Node IDs can be from 10 (for R4) through 13 (for R7). And so on.

Each J/P Path may be a sequence of the routers' Node IDs in the path (e.g. from the LHR to the root). The path's links may be specified explicitly in J/P Path, or may be omitted if they can be calculated from the Node IDs and DB 140.

In some embodiments, the J/P Path routers are defined as a bitmap: each bit corresponds to a router, and the bit is set if, and only if, the router is in the J/P Path. An example bitmap scheme for identifying routers is described in RFC 8279, "Multicast Using Bit Index Explicit Replication (BIER)", Internet Engineering Task Force (IETF), November 2017, incorporated herein by reference.

However, the bitmap may or may not be adequate to define the sequence of the routers in J/P Path. In some embodiments, the root can calculate the sequence from the bitmap using the lowest cost to the root: the lowest cost should decrease along the path from the LHR to the root. Also, the routers adjacent to each other in the router sequence can be neighbors in the network, and the root may use this fact to determine the router sequence. However, the invention is not limited to increasing or decreasing costs along paths, and the adjacency in the sequence does not necessarily define the links in the path. If the bitmap is inadequate, additional information is provided in J/P Path to allow the root to determine the router sequence as needed for DB 410.

Block 520: Feedback Messages

An exemplary feedback message is shown in Table 3. The feedback message can be a unicast IP message. Only the payload 120.P is shown (FIG. 2). The IP destination address 120.DA of the feedback message can be the root's router ID.

The source address 120.SA can be the router ID of the router sending the feedback message.

The Type field has a value identifying the message as the Feedback message. The last line identifies the link or interface or router whose congestion-or-failure state is reported in the "Feedback" field of the message. The "Feedback" field identifies the congestion-or-failure state, e.g. how busy the link or interface or router is in terms of bandwidth utilization or store-and-forward memory utilization or forwarding delays or some other parameters. Multiple parameters can be provided in the same Feedback message. In one embodiment, the following codes are used for the Feedback field:

0 means no congestion or failure.

1 means there is a problem on the interface or link or router specified in the last row of Table 3. For example, 1 may indicate that the traffic bandwidth on the specified link exceeds some link utilization threshold (e.g. exceeds 80% of the link's total bandwidth).

2 means traffic exceeds a higher threshold (e.g. 90% of the total bandwidth).

3 means traffic is being dropped due to congestion.

The Feedback message can include other pertinent information, e.g. the (S,G) or (*,G) state of the traffic being dropped, as indicated in the last row of Table 3.

The Feedback values may be associated with colors for use on the administrator's display if needed: e.g. Green, Yellow, Red, and Black for 0, 1, 2, and 3 respectively.

Other codes or coded information can be present in the message.

TABLE 3

| FEEDBACK MESSAGE FORMAT | | | |
|---|---|---|---|
| Version | Type | Feedback | Checksum |
| State, i.e. (S, G) or (*, G), and/or interface's IP address, or other information identifying the congestion or failure | | | |

Block 540: Redirect Request

An exemplary Redirect request is illustrated in Table 4. The source and destination IP addresses 120.SA and 120.DA can be the router IDs, respectively, of the sending root and of the router requested to initiate the tree modification. The payload 120.P includes the fields described in Table 4, and additional fields such as Version, Type, and Checksum as in Table 3; the Type value identifies the message as Redirect request. As shown in the last row of Table 4, the alternate path can be specified as the sequence of the Node IDs, possibly with link and/or interface IDs (e.g. IP interface addresses), and/or via the bitmap, as described above. Alternatively, the Redirect request may include a command to switch from RPT to SPT or vice versa, and may specify the sources S and groups G for this switch as appropriate.

TABLE 4

| REDIRECT REQUEST |
|---|
| Encoded source/group addresses (S, G) or (*, G) |
| Alternate path, or command to switch from RPT to SPT or vice versa, or other information as appropriate |

Block 550: Tree Modification

Figure 8:
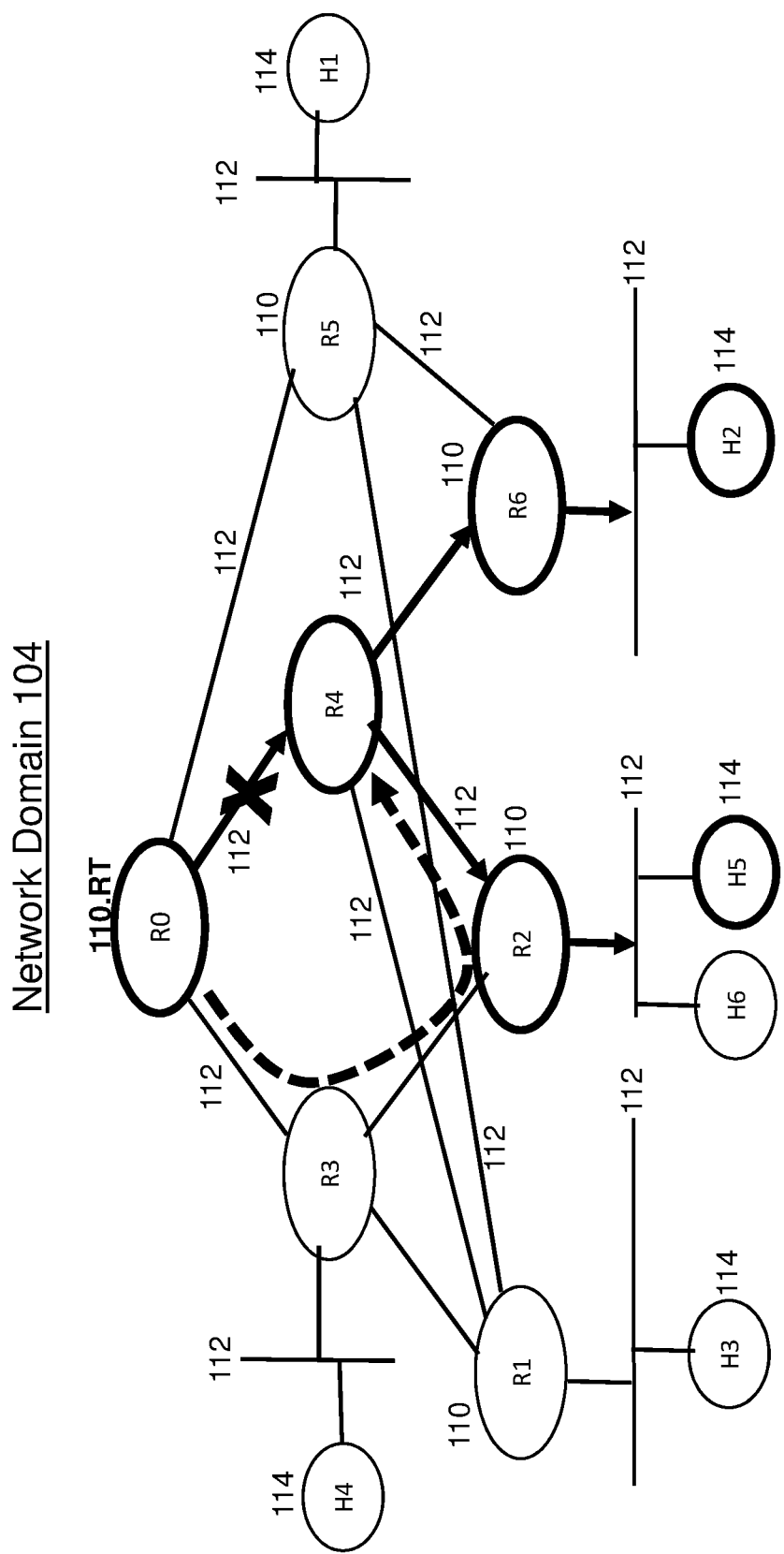
FIGS. 8 and 9 are schematic views illustrating some embodiments of network management methods.

In the example of FIG. 8, suppose the original RPT had a root R0 with a path R0-R4 branching, at R4, into R4-R6 and R4-R2. Then the R0-R4 link became congested, and R0 sent a Redirect request to R4 with the alternate path R0-R3-

R2-R4. In response, R4 sends a Join to R2. An exemplary Join format is shown in Table 5. This Join specifies the alternate path in the Alternate Path field following the corresponding "Encoded Joined Source Address". The Alternate Path field is unchanged when the Join is propagated to R2, then to R3, and then to R0. Alternatively, the Alternate Path may be modified by deleting, at each router, the Alternate Path portion downstream of the router. Indeed, the root already knows the Alternate Path (since the root calculated the Alternate Path in block 530 and included it in the Redirect request in block 540); and the intermediate routers need to know only the upstream portion of the Alternate Path in order to propagate the Join.

The Join of Table 5 may be combined with other Joins and/or Prunes.

R2 may also send a Prune to R4 to prune the R2-R4 path since R2 will receives the traffic via R3. This Prune may have the J/P Path field as in Table 2 so that the root R0 would be informed of the Prune. (In this example, the Prune's J/P Path does not need to include any path portion downstream of R2, even if the network domain has routers downstream of R2.)

TABLE 5

MODIFED JOIN/PRUNE WITH ALTERNATE PATH

| PIM Ver | Type = 3 | Reserved | Checksum |
|---|---|---|---|
| Encoded Unicast Upstream Neighbor Address (e.g. R4 or R5) | | | |
| Reserved | Num groups | | Holdtime |
| Encoded Multicast Group Address 1 | | | |
| Number of Joined Sources | | Number of Pruned Sources | |
| Encoded Joined Source Address 1 | | | |
| Alternate Path | | | |

FHR to RP Path Management

A FHR can forward traffic both on the SPT and to the RP for the RPT. For example, in FIG. 9, R1 is the FHR for H3. H3 is a source of multicast traffic for some group G including H5, H2, and H1. The SPT includes the link R1-R4, and the branches R4-R2 (for H5) and R4-R6 (for H2). At the same time, R1 sends the traffic to RP router R0, on the path R1-R3-R0, for forwarding on the RPT. The RPT includes the link R0-R5 for H1.

Figure 10:
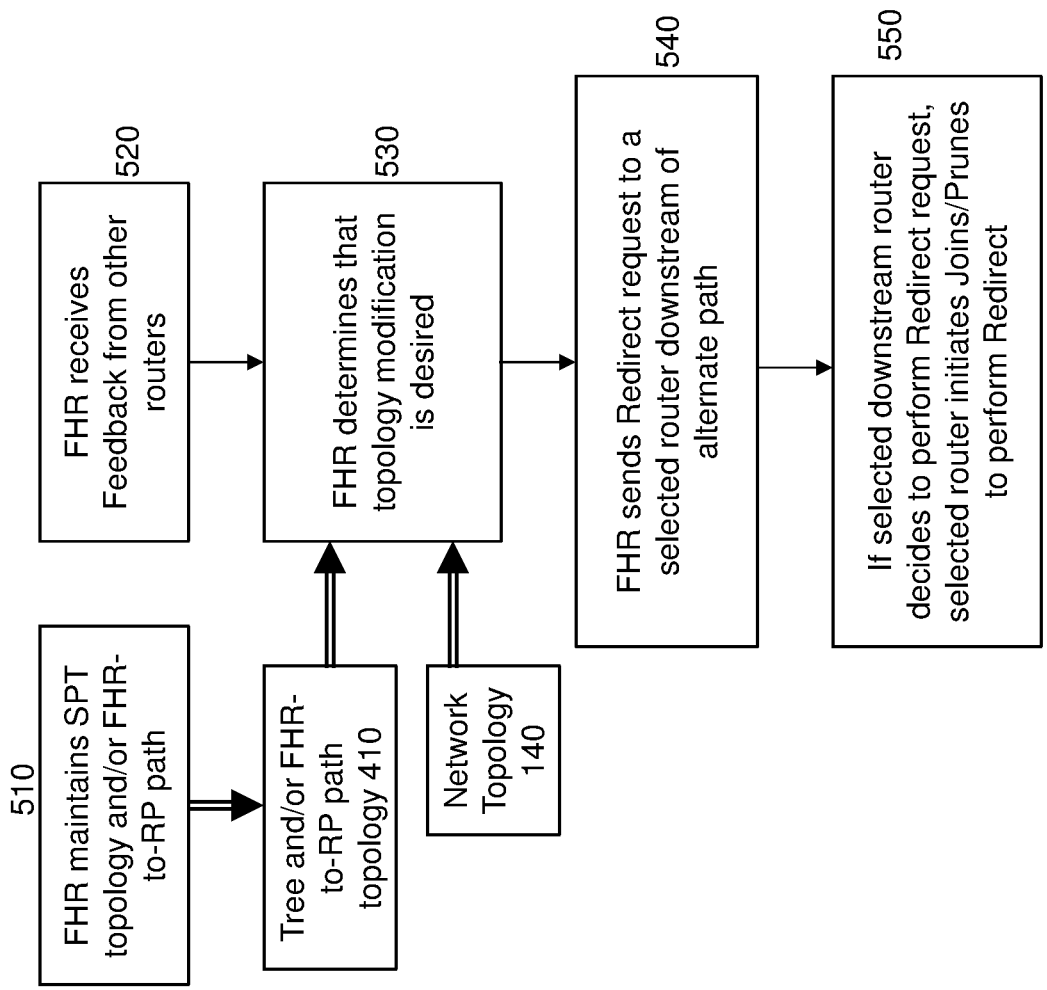
FIG. 10 is a flow chart illustrating an embodiment of a network management method.

In R1, the DB 410 may include the R1-R3-R0 path to the RP, and this path can be managed in the same way as the SPT. This is so even if the SPT is empty. The network management is illustrated in FIG. 10. As is known from PIM-SM, when H3 first starts sending multicast traffic, R1 may, at first, encapsulate the multicast packets in unicast packets to R0 (Register operation) because initially R1's MRIB is not provisioned to forward multicast traffic. Upon receipt of the encapsulated packets, R0 (the RP) sends a Join towards R1. The Join is received by R3, then propagated to R1. Upon receipt of the Join, R1 and R3 provision their MRIBs to forward multicast packets to R0, and R1 starts sending the multicast packets without encapsulation.

Figure 9:
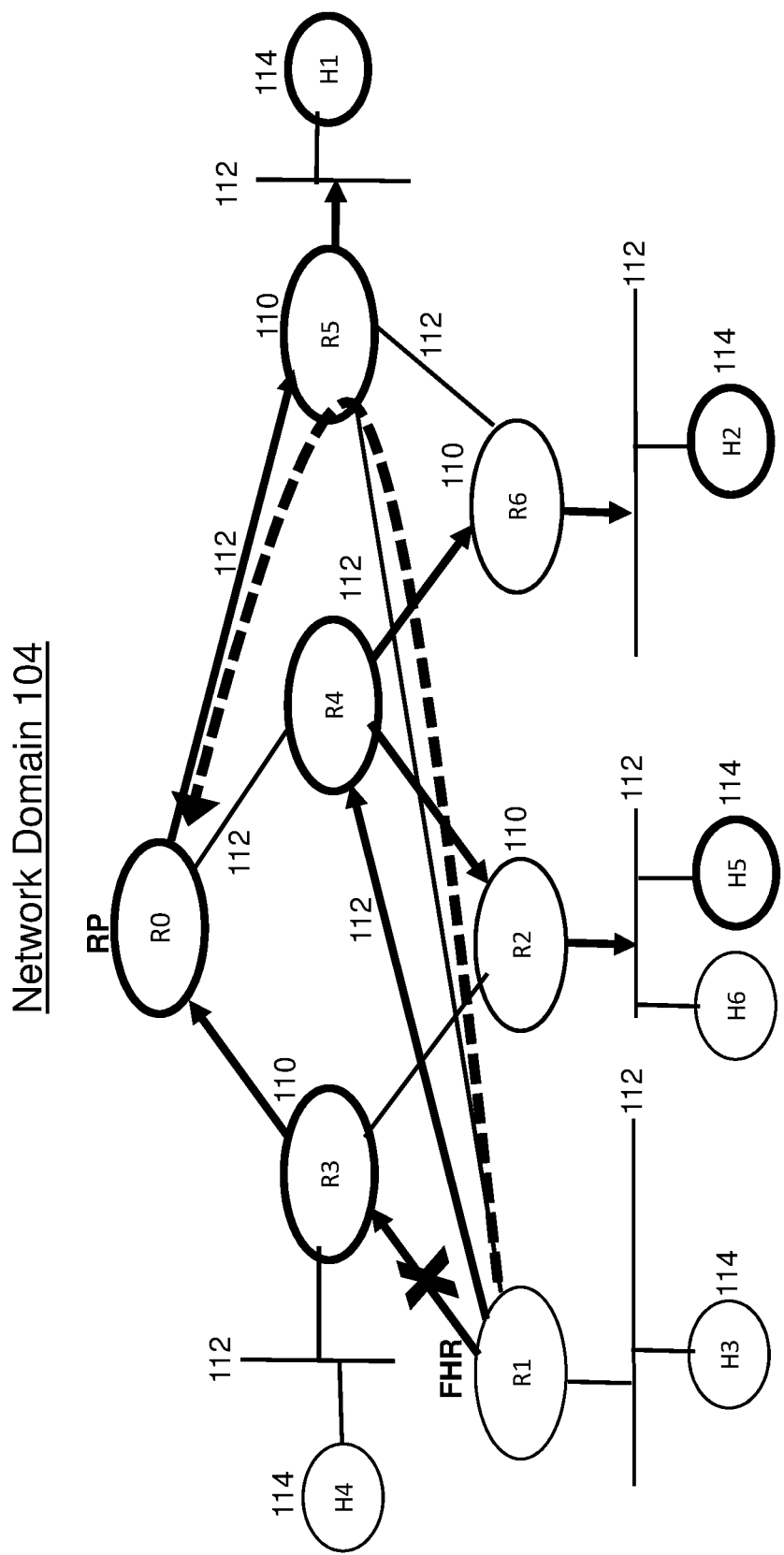

In some embodiments, regardless of whether the SPT is empty, the FHR router R1 creates and maintains, in its control plane 110C, DB 410 for storing the topology of the path from R1 to R0 (block 510 in FIG. 10) in addition to the SPT topology. The R1-to-R0 path topology may be formed using any techniques described above in connection with FIG. 5, e.g. using J/P Path in the Join that R0 sends towards R1. In block 520 (FIG. 10), routers 110 (including R0 and R3) provide R1 with feedback messages regarding the congestion or failure on the path from R1 to R0, as described above in connection with FIG. 5. Based on the feedback, or on R1's own determination of congestion or failure on the R1-R3 link, R1 may decide to modify the R1 to R0 path (block 530 in FIG. 10), and may determine an alternate path. In the example of FIG. 9, R1 discovered congestion of failure on the R1-R3 link, and R1 decides to form an alternate path R1-R5-R0. In block 540, R1 sends a unicast Redirect request to R0, specifying the alternate path (see Table 4). In block 550, the router receiving the Redirect request (i.e. R0) may initiate a Join to establish the alternate path to R1 (as in Table 5). The other features can be as in FIG. 5.

ECMP Management

Figure 3:
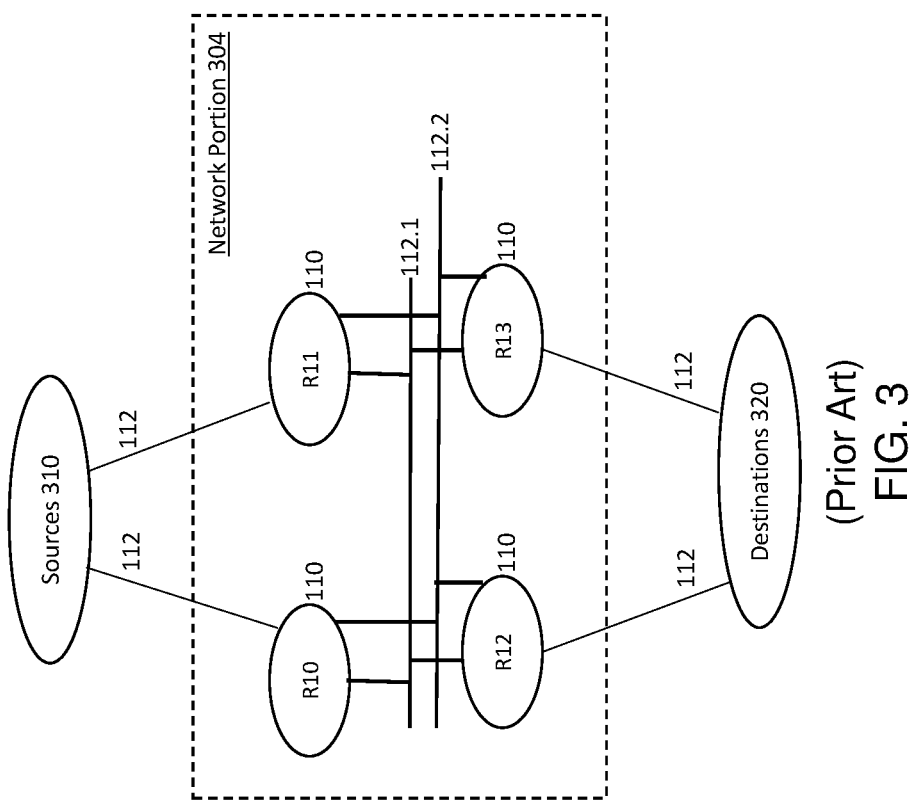
FIG. 3 is a schematic view illustrating a network embodiment.

In some embodiments, DB 410 allows non-local extension of services previously available locally via ECMP Redirect (see FIG. 3). For example, in FIG. 1, router R2 has multiple paths to R0, including R2-R4-R0 and R2-R3-R0. In some embodiments, these paths form an ECMP group. When sending Joins for a given group G towards the root R0, router R2 may send a Join to R4 or R3. For example, in some embodiments, R2 selects R4 or R3 based on a hash of some fields in the Join packet. In other embodiments, R2 selects R4 or R3 based on the maximum available bandwidth on the links R2-R3 and R2-R4, or based on the maximum total bandwidth on these links.

Suppose a Join was sent to R4. R4 propagates the Join to R0, and R0 records the path R0-R4-R2 for a given state, i.e. (S,G) or (*,G) or (S,G,rpt), in its topology DB 410. R0 also updates its MRIB 139.

Suppose the router R2 sends another Join for the same state to R3. When this Join propagates to R0, the router R0 updates its MRIB, to send the multicast packets to both R3 and R4 as in prior art. However, in addition, router R0 may detect, via tree topology 410, that the Joins originate from the same LHR R2. Router R0 may send a Redirect message to R2, requesting R2 to prune the path through R3 and just use the path through R4. If R2 performs this request, then the multicast messages from R0 to R2 will go only through R4, and will not be duplicated through R3.

These services do not require R2 to be the LHR. R2 can be any router on a path from the LHR to the root of SPT or RPT. Further, while the ECMP paths R2-R3-R0 and R2-R4-R0 are only two hops each, the ECMP paths can be any number of hops.

In some embodiments, R2 and R4 form a Virtual Link Trunking (VLT) System, such as described in the aforementioned U.S. Pat. No. 9,210,072.

As can be seen from description of some embodiments hereinabove, the root router 110.RT acts in some way as a controller of a software defined network (SDN); see U.S. Pat. No. 9,276,877 B1 (issued Mar. 1, 2016; inventors: Chua et al.); and U.S. Pat. No. 9,300,483 B2 (issued Mar. 29, 2016; inventors: Banavalikar et al.), both incorporated herein by reference. However, some embodiments of the present invention have relatively low complexity, and do not require a separate controller system. Also, some embodiments can be retrofitted into the existing technology, e.g. PIM-SM, with minimal changes to routers, possibly with no change to the data planes. (The operations of FIGS. 5 and 10 can be implemented in the control planes.) The invention is not limited to such embodiments however.

The invention includes network management methods and routers, and computer readable media with computer instructions for execution by the routers' control planes and/or data planes to perform such methods. For example, the computer readable medium can be memory 134C or a separate memory from which the computer instructions can be transferred to memory 134C. Some embodiments of the invention are defined by the following clauses:

Clause 1 defines a method for managing multicast transmissions in a network comprising a plurality of routers, the method comprising:

maintaining multicast topology information (e.g. 410) at a first router which is at least one of a first hop router or a root of a first multicast distribution tree, wherein the multicast topology information identifies one or more multicast distribution paths, each multicast distribution path beginning at the first router and ending either at a root of a second multicast distribution tree or at a last hop router (for example, the multicast topology information may allow the first router to identify each router in the path, and identify the sequence of routers in the path, and possibly identify each link in the path, possibly via IP interfaces or other identification, e.g. virtual LAN IDs);

determining, by the first router, that a negative condition exists in the one or more multicast distribution paths, and determining a desired change of the one or more multicast distribution paths to relieve the negative condition; and sending, by the first router to a first downstream router which is part of at least one said path and which is downstream of the desired change, a Redirect request requesting the first downstream router to initiate the desired change.

2. The method of clause 1 wherein the desired change is an alternate path that bypasses the negative condition, and the Redirect request identifies the alternate path.

3. The method of clause 1 or 2, wherein the negative condition is congestion or failure.

4. The method of clause 1 wherein the negative condition is duplication of multicast traffic on different paths, and the desired change is making one or more of the different paths unavailable for the duplication.

5. The method of any preceding clause, wherein the first router is the root of the first multicast distribution tree, and wherein the desired change comprises switching from the first multicast distribution tree to another multicast distribution tree.

6. The method of any preceding clause, wherein maintaining the multicast topology information comprises receiving, by the first router from one or more other routers, notifications of changes of multicast routing tables at the one or more routers, and updating the multicast topology information to reflect the changes. (A routing table may be a database storing the pertinent data, and may or may not be arranged as a "table" in the router's memory; the routing table may include instructions to calculate some data instead of storing the data.)

7. The method of any preceding clause, wherein maintaining the multicast topology information comprises receiving, by the first router, multicast control messages initiated by one or more last hop routers to join network nodes to multicast groups, each multicast control message identifying a path in which the multicast control message was propagated from the respective last hop router to the first router.

8. The method of any preceding clause, wherein the negative condition is detected by one or more routers downstream of the first router in the one or more multicast distribution paths, and the first router learns pf the negative condition from messages from the one or more routers downstream of the first root router.

9. The method of any preceding clause, wherein at least one of the one or more multicast distribution paths comprises more than two hops.

Some embodiments include a first router configured to perform a method according to any of the clauses described above. Some embodiments include a computer readable medium comprising computer instructions for execution by a control plane of a first router to cause the first router to perform a method according to any of the clauses described above The control and data planes can be functional blocks that are not necessarily separated as in FIG. 4. Also, the control plane can be shared with multiple routers. The invention is not limited to any particular router architecture. Other embodiments and variations are within the scope of the invention, as defined by the appended claims.

What is claimed is:

1. A method for managing multicast distribution paths, the method comprising:

maintaining, by a first router that is at least one of a first hop router or a root of a first multicast distribution tree, multicast topology information that, for a plurality of multicast distribution paths that each begin at the first router, identifies at least three hops in that multicast distribution path that end at either a root of a second multicast distribution tree or at a last hop router;

determining, by the first router, that a negative condition exists in a first multicast distribution path that is included in the plurality of multicast distribution paths;

determining, by the first router in response to determining that the negative condition exists in the first multicast distribution path and based on the multicast topology information that identifies the at least two three hops in the first multicast distribution path that end at either the root of the second multicast distribution tree or at the last hop router, a multicast distribution path change to the first multicast distribution path that is configured to relieve the negative condition; and sending, by the first router to a first downstream router that is included in the at least three hops in the first multicast distribution path and that is downstream of the multicast distribution path change to the first multicast distribution path, a redirect request that is configured to cause the first downstream router to initiate the multicast distribution path change.

2. The method of claim 1, wherein the multicast distribution path change is configured to provide an alternate multicast distribution path that bypasses the negative condition that exists in the first multicast distribution path, and wherein the redirect request identifies each hop in the alternate multicast distribution path.

3. The method of claim 1, wherein the negative condition includes either congestion in the first multicast distribution path or failure in the first multicast distribution path.

4. The method of claim 1, wherein the negative condition includes duplication of multicast traffic on different multicast distribution paths, and wherein the multicast distribution path change is configured to make one or more of the different multicast distribution paths unavailable in order to eliminate the duplication of multicast traffic on the different multicast distribution paths.

5. The method of claim 1, wherein the first router is the root of the first multicast distribution tree, and wherein the multicast distribution path change is configured to switch to a multicast distribution tree that is different than the first multicast distribution tree.

6. The method of claim 1, wherein maintaining the multicast topology information comprises:

receiving, by the first router from one or more other routers that are included in the plurality of multicast distribution paths, notifications of changes of multicast routing tables at the one or more routers; and updating, by the first router based on the notifications of changes, the multicast topology information.

7. The method of claim 1, wherein maintaining the multicast topology information comprises:
receiving, by the first router, multicast control messages that were initiated by one or more last hop routers and that request to join network nodes to multicast groups, wherein each multicast control message identifies a multicast distribution path in which the multicast control message was propagated from the respective last hop router to the first router.

8. The method of claim 1, wherein the negative condition is detected by one or more routers that are downstream of the first router and that are included in the plurality of multicast distribution paths, and wherein the first router learns of the negative condition from messages from the one or more routers that are downstream of the first router.

9. A first router, including:
a processing system; and
a memory system that is coupled to the processing system and that includes instructions that, when executed by the processing system, cause the processing system to perform operations comprising:
maintaining multicast topology information that, for a plurality of multicast distribution paths, that each begin at a first router that is at least one of a first hop router or a root of a first multicast distribution tree, identifies at least three hops in that multicast distribution path that end at either a root of a second multicast distribution tree or at a last hop router;
determining that a negative condition exists in a first multicast distribution path that is included in the plurality of multicast distribution paths;
determining, in response to determining that the negative condition exists in the first multicast distribution path and based on the multicast topology information that identifies the at least two three hops in the first multicast distribution path that end at either the root of the second multicast distribution tree or at the last hop router, a multicast distribution path change to the first multicast distribution path that is configured to relieve the negative condition; and
sending, to a first downstream router that is included in the at least three hops in the first multicast distribution path and that is downstream of the multicast distribution path change, a redirect request that is configured to cause the first downstream router to initiate the multicast distribution path desired change.

10. The first router of claim 9, wherein the multicast distribution path change is configured to provide an alternate multicast distribution path that bypasses the negative condition that exists in the first multicast distribution path, and wherein the redirect request identifies each hop in the multicast distribution path.

11. The first router of claim 9, wherein the negative condition includes either congestion in the first multicast distribution path or failure in the first multicast distribution path.

12. The first router of claim 9, wherein the negative condition includes duplication of multicast traffic on different multicast distribution paths, and wherein the multicast distribution path change is configured to make one or more of the multicast distribution paths unavailable in order to eliminate the duplication of multicast traffic on the different multicast distribution paths.

13. The first router of claim 9, wherein the first router is the root of the first multicast distribution tree, and wherein the multicast distribution path change is configured to switch to a multicast distribution tree that is different than the first multicast distribution tree.

14. The first router of claim 9, wherein maintaining the multicast topology information comprises:
receiving, by the first router from one or more other routers that are included in the plurality of multicast distribution paths, notifications of changes of multicast routing tables at the one or more routers; and
updating, based on the notifications of changes, the multicast topology information.

15. The first router of claim 9, wherein maintaining the multicast topology information comprises:
receiving, by the first router, multicast control messages that were initiated by one or more last hop routers and that request to join network nodes to multicast groups, wherein each multicast control message identifies a multicast distribution path in which the multicast control message was propagated from the respective last hop router to the first router.

16. The first router of claim 9, wherein the negative condition is detected by one or more routers that are downstream of the first router and that are included in the plurality of multicast distribution paths, and wherein the first router learns of the negative condition from messages from the one or more routers that are downstream of the first router.

17. A non-transitory, computer readable medium comprising computer readable instructions that are executable by one or more processors to cause the one or more processors to perform operations comprising:
maintaining multicast topology information that, for a plurality of multicast distribution paths that each begin at a first router that is at least one of a first hop router or a root of a first multicast distribution tree, identifies at least three hops in that multicast distribution path that end at either a root of a second multicast distribution tree or at a last hop router;
determining that a negative condition exists in a first multicast distribution path that is included in the plurality of multicast distribution paths;
determining, in response to determining that the negative condition exists in the first multicast distribution path and based on the multicast topology information that identifies the at least two three hops in the first multicast distribution path that end at either the root of the second multicast distribution tree or at the last hop router, a multicast distribution path change to the first multicast distribution path that is configured to relieve the negative condition; and
sending, to a first downstream router that is included in the at least three hops in the first multicast distribution path and that is downstream of the multicast distribution path change, a redirect request that is configured to cause the first downstream router to initiate the multicast distribution path change.

18. The non-transitory, computer readable medium of claim 17 wherein the multicast distribution path change is configured to provide an alternate multicast distribution path that bypasses the negative condition that exists in the first multicast distribution path, and the redirect request identifies each hop in the alternate multicast distribution path.

* * * * *

UNITED STATES PATENT AND TRADEMARK OFFICE
CERTIFICATE OF CORRECTION

PATENT NO. : 11,296,980 B2
APPLICATION NO. : 16/556045
DATED : April 5, 2022
INVENTOR(S) : Muthulakshmi Radhakrishnan It is certified that error appears in the above-identified patent and that said Letters Patent is hereby corrected as shown below:

In the Claims

Claim 17, Column 16, Line 38, "identities" should be changed to --identifies--.

Signed and Sealed this
Ninth Day of August, 2022

Katherine Kelly Vidal
*Director of the United States Patent and Trademark Office*